United States Patent
Elliot et al.

(10) Patent No.: US 6,188,539 B1
(45) Date of Patent: Feb. 13, 2001

(54) EXTENDED POSITION ERROR SIGNAL LINEARIZATION AND NORMALIZATION

(75) Inventors: Mark Lowell Elliot, Eden Prairie; Alexei Hiram Sacks, St. Louis Park, both of MN (US); Duc Tien Phan, Saratoga, CA (US)

(73) Assignee: Seagate Technology LLC, Scotts Valley, CA (US)

(*) Notice: Under 35 U.S.C. 154(b), the term of this patent shall be extended for 0 days.

(21) Appl. No.: 09/115,574

(22) Filed: Jul. 14, 1998

Related U.S. Application Data

(60) Provisional application No. 60/061,724, filed on Oct. 10, 1997.

(51) Int. Cl.[7] .................................................. G11B 5/596
(52) U.S. Cl. ................................................... 360/77.08
(58) Field of Search ........................ 360/77.08, 77.02, 360/77.05, 77.07, 78.04, 78.14

(56) References Cited

U.S. PATENT DOCUMENTS

| | | | |
|---|---|---|---|
| 5,305,159 | 4/1994 | Sakai et al. | 360/77.02 |
| 5,381,281 | 1/1995 | Shrinkle et al. | 360/77.08 |
| 5,521,771 | 5/1996 | Keithley et al. | 360/75 |
| 5,659,437 | 8/1997 | Tsunekawa et al. | 360/77.08 |
| 5,774,297 | * 6/1998 | Hampshire et al. | 360/77.07 X |
| 5,781,361 | * 6/1998 | Le et al. | 360/77.08 |

* cited by examiner

*Primary Examiner*—Hoa T. Nguyen
*Assistant Examiner*—James L Habermehl
(74) *Attorney, Agent, or Firm*—Westman, Champlin & Kelly, PA

(57) ABSTRACT

A method of producing a position error signal includes storing a normal position error value generated from a normal servo field and a quadrature position error value generated from a quadrature servo field, where the normal servo field is ninety degrees out of phase from the quadrature servo field. A position error numerator is created by arithmetically combining the normal position error value and the quadrature position error value. A position error denominator is created based on the normal position error value and the quadrature position error value. The position error signal is produced by dividing the position error numerator by the position error denominator.

17 Claims, 6 Drawing Sheets

PATH TYPE ONE
A B C D

PATH TYPE THREE
A B C D

PATH TYPE ZERO
A B C D

PATH TYPE TWO
A B C D

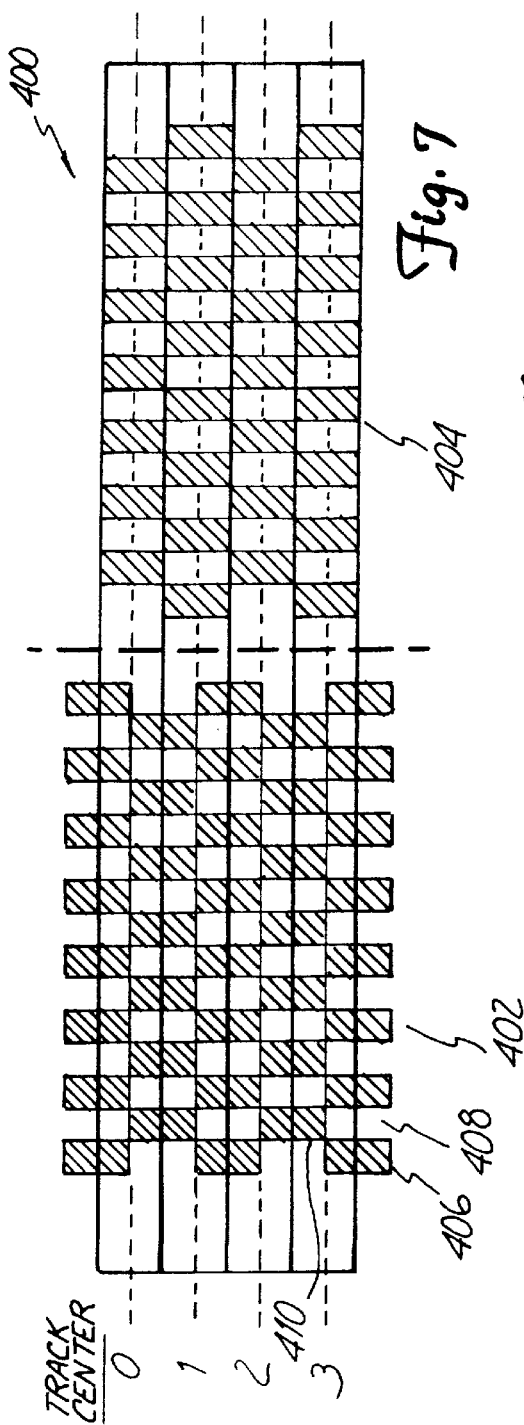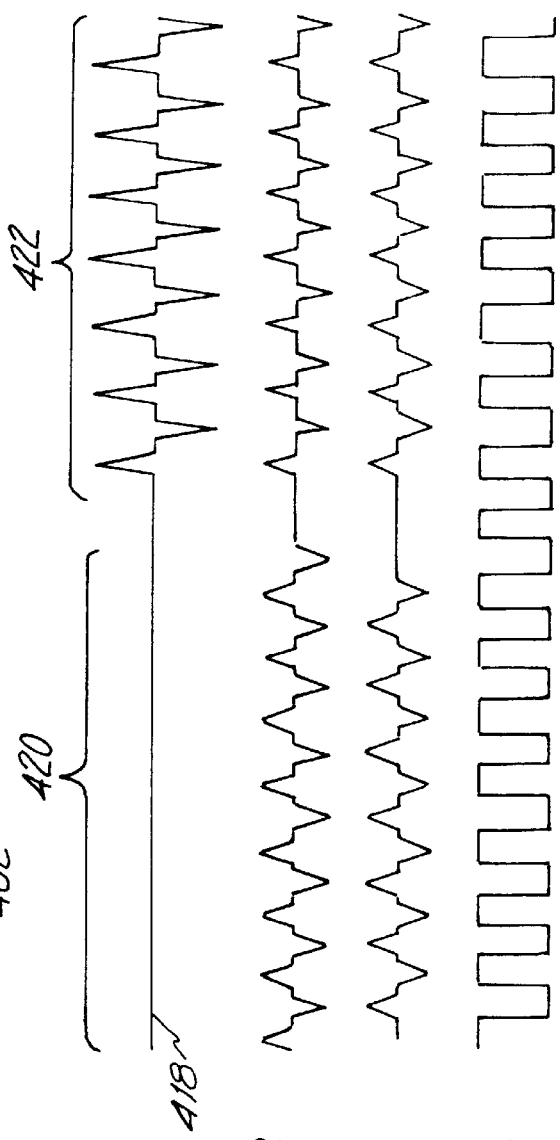

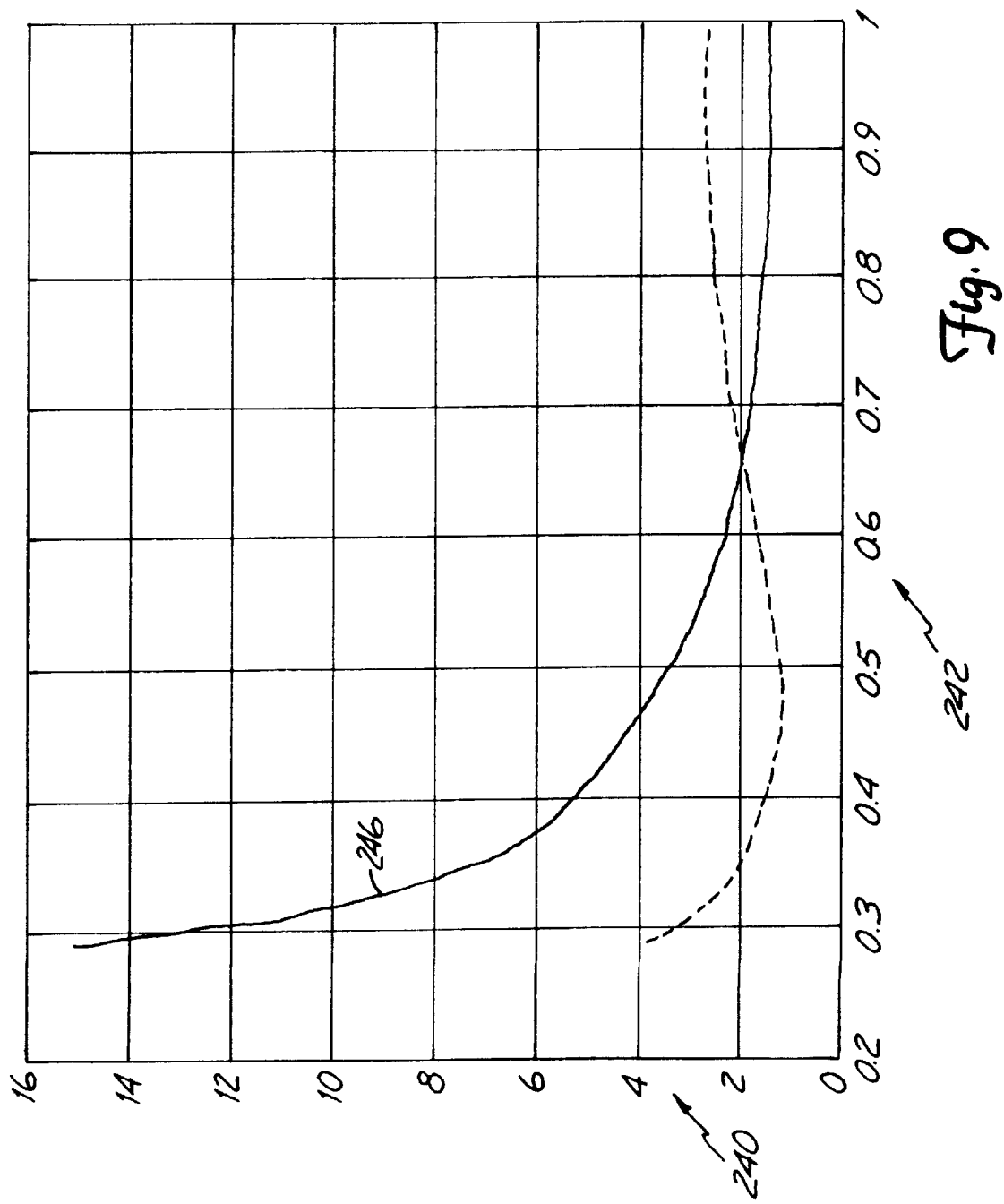

EXTENDED POSITION ERROR SIGNAL LINEARIZATION AND NORMALIZATION

REFERENCE TO RELATED APPLICATION

The present application claims priority benefits from U.S. provisional application Ser. No. 60/061,724, filed on Oct. 10, 1997 and entitled EXTENDED POSITION ERROR SIGNAL LINEARIZATION AND NORMALIZATION.

FIELD OF THE INVENTION

The present invention relates to servo systems in storage devices. In particular, the present invention relates to position error signals for servo systems.

BACKGROUND OF THE INVENTION

A storage device, such as a magnetic disc drive, stores data on a recording medium that is divided into a large number of tracks. The data are stored and retrieved by a head that is positioned over a desired track by a servo system. This positioning is typically performed using servo fields located on the medium. As the head passes over the servo fields, it generates a servo signal that identifies the location of the head. Based on this location, the servo system adjusts the head's position so that it moves toward the desired position.

Preferably, the signals from the servo fields can be combined to provide a linear position error signal. If the position error signal is linear, a change in the position error signal corresponds to an equal amount of change in the position of the head. This allows the servo system to move the head directly from the position error signal. If the position error signal is not linear, the servo system must perform further calculations to determine the position from the position error signal. In some devices, these additional calculations are avoided by treating a non-linear position error signal as a linear signal. However, using such linear estimations reduces the accuracy of the servo positioning.

Typically, the position error signal is created from a series of position error values that are based upon a normal position error value, N, and/or a quadrature position error value, Q. Both values change in a cyclical manner as the head moves radially along the disc. If these changes are graphed as a function of radial position, they have the appearance of cyclical signals, which in the art are known as the normal position error signal and the quadrature position error signal. The quadrature signal has the same cyclical pattern as the normal signal, except that it is ninety degrees out of phase from the normal signal. Thus, at a radial location where the normal signal is at a maximum the quadrature signal is at zero. Similarly, at a different radial location where the quadrature signal is at a maximum, the normal signal is at zero.

The normal and quadrature signals developed in the prior art have had limited linear ranges. Because of this, the art has attempted to extend their linear range. One such extension produces a normal position error signal NPQ, and a quadrature position error signal NMQ. An NPQ signal is produced by adding an N and a Q position error signal together. An NMQ position error signal is created by subtracting a Q position error signal from an N position error signal. To produce a complete position error signal, the servo system commutates between the NPQ and the NMQ signals at commutation points or boundaries.

For narrow width heads, the NMQ and NPQ signals are more linear about their respective zeros than the N and Q signals. However, the complete position error signal produced by the NPQ and NMQ signals tends to include discontinuities created at the commutation boundaries. These discontinuities are generated by differences in the magnitudes of the NPQ and NMQ signals. Such discontinuities in the position error signal result in decreased track following accuracy.

To remove the discontinuities at the commutation boundaries, the art developed a second extended linearization for position error signals, known as "SEAMLESS". The normal and quadrature SEAMLESS signals are described by the formulas:

$$\text{SEAMLESS}_n = \frac{N}{|N| + |Q|} \qquad \text{Equation 1}$$

$$\text{SEAMLESS}_q = \frac{Q}{|N| + |Q|} \qquad \text{Equation 2}$$

where $\text{SEAMLESS}_n$ is the normal SEAMLESS signal, $\text{SEAMLESS}_q$ is the quadrature SEAMLESS signal, which is ninety degrees out of phase from $\text{SEAMLESS}_n$, and $|N|$ and $|Q|$ are the magnitudes of N and Q, respectively.

The seamless formulas normalize the normal and quadrature signals to +/−1. In addition, for wider heads, the resulting normal and quadrature SEAMLESS traces will be very linear between +/−1. Unfortunately, for typical heads with narrow magnetic reader widths, SEAMLESS actually increases cross-track non-linearity.

Thus, the prior art fails to provide a sufficiently linear position error signal for narrow heads that does not include discontinuities. The present invention addresses this and other problems, and offers other advantages over the prior art.

SUMMARY OF THE INVENTION

A method of producing a position error value includes storing a normal position error value generated from a normal servo field and a quadrature position error value generated from a quadrature servo field, where the normal servo field is ninety degrees out of phase from the quadrature servo field. A position error numerator is created by arithmetically combining the normal position error value and the quadrature position error value. A position error denominator is created based on the normal position error value and the quadrature position error value. The position error value is produced by dividing the position error numerator by the position error denominator.

Preferred embodiments of the present invention additionally include the ability to select between a position error value described above and a SEAMLESS position error value.

BRIEF DESCRIPTION OF THE DRAWINGS

FIG. 7 is a layout for a portion of a second type of servo field.

FIG. 8-1 is a graph of a read signal produced by a head traveling along a track center of the layout in FIG. 7.

FIG. 8-2 is the component of the read signal of FIG. 8-1 that is created by the outer radial half of the head.

FIG. 8-3 is the component of the read signal of FIG. 8-1 that is created by the inner radial half of the head.

FIG. 8-4 is a square wave used in synchronous rectification of the read signal.

FIG. 9 is a graph of gain ratio versus magnetic reader width for a position error signal of the present invention and for a SEAMLESS position error signal.

DETAILED DESCRIPTION OF THE PREFERRED EMBODIMENTS

Figure 1:
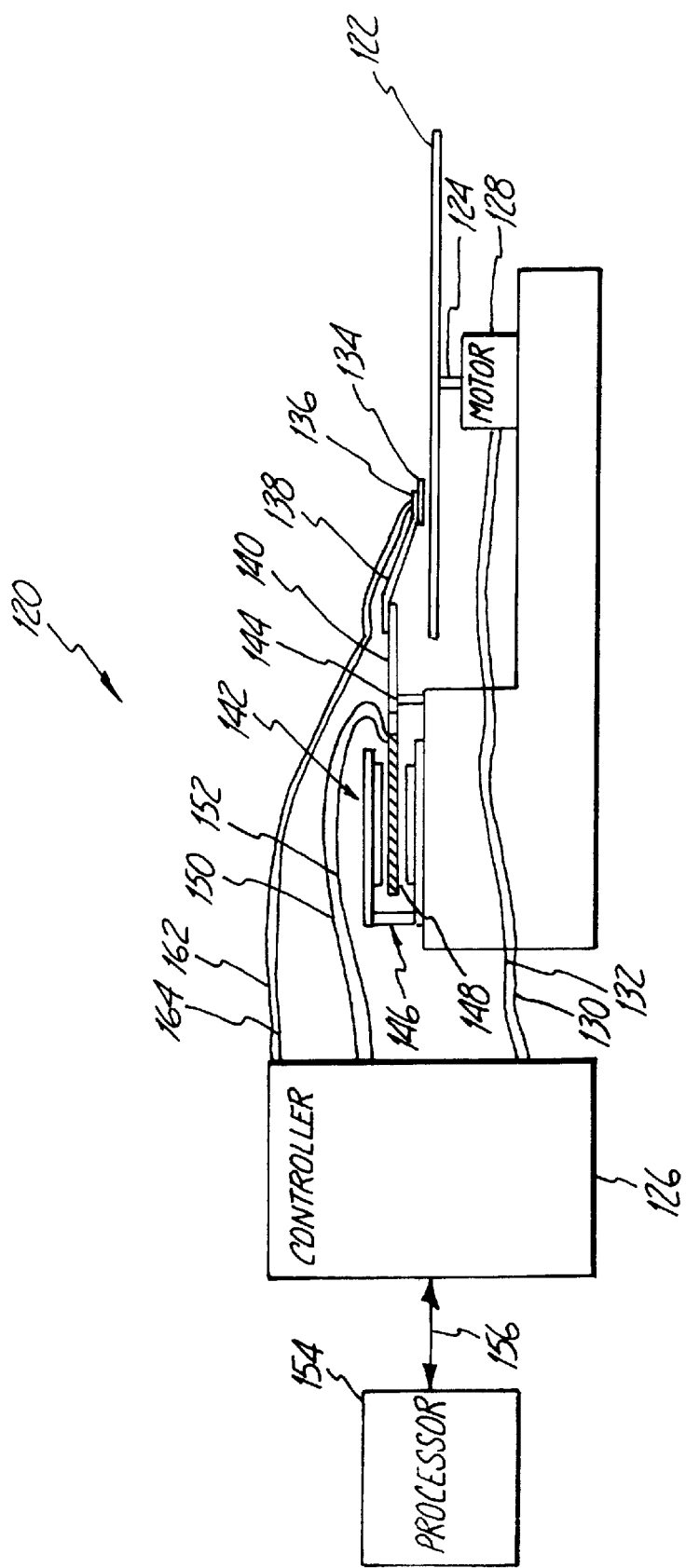
FIG. 1 is a combination block diagram and side view of a disc drive under the present invention.

FIG. 1 is a combination block diagram and side view of storage system 120 of the present invention. In system 120, a disc 122 spins about a spindle 124 under the control of controller 126 acting through motor 128. Controller 126 is connected to motor 128 through motor control conductors 130 and 132.

The rotation of disc 122 causes a head 134 to lift off the surface of disc 122. Head 134 is positioned over the surface of the disc through a suspension assembly consisting of gimbal 136, flexure arm 138, load beam 140, and actuator 142. The suspension assembly pivots about pivot point 144 causing head 134 to move in an arc over the surface of disc 122.

Actuator 142 includes magnetic assembly 146 and magnetic coil 148. Magnetic coil 148 is formed on an actuator arm extending opposite of load beam 140 across pivot point 144. Conductors 150 and 152 are connected to magnetic coil 148 and to controller 126. Through conductors 150 and 152, controller 126 passes a current through magnetic coil 148 causing magnetic coil 148 to produce a magnetic field that interacts with magnetic fields generated by the magnets of magnetic assembly 146. This interaction causes suspension assembly 120 to pivot about pivot point 144 and thereby moves head 134 in an arc across disc 122.

The desired speed for motor 128 and the desired location for head 134 is communicated to controller 126 by a processor 154 that communicates to controller 126 through a bi-directional bus 156. In addition, controller 126 receives signals from head 134 along read conductors 162 and 164. As head 134 passes over a servo field, it generates servo signals along read conductors 162 and 164 that controller 126 uses to determine the current location of the head. Based on the current location of the head, and the desired location received from processor 154, controller 126 generates a current used to control magnetic coil 148.

Figure 2:
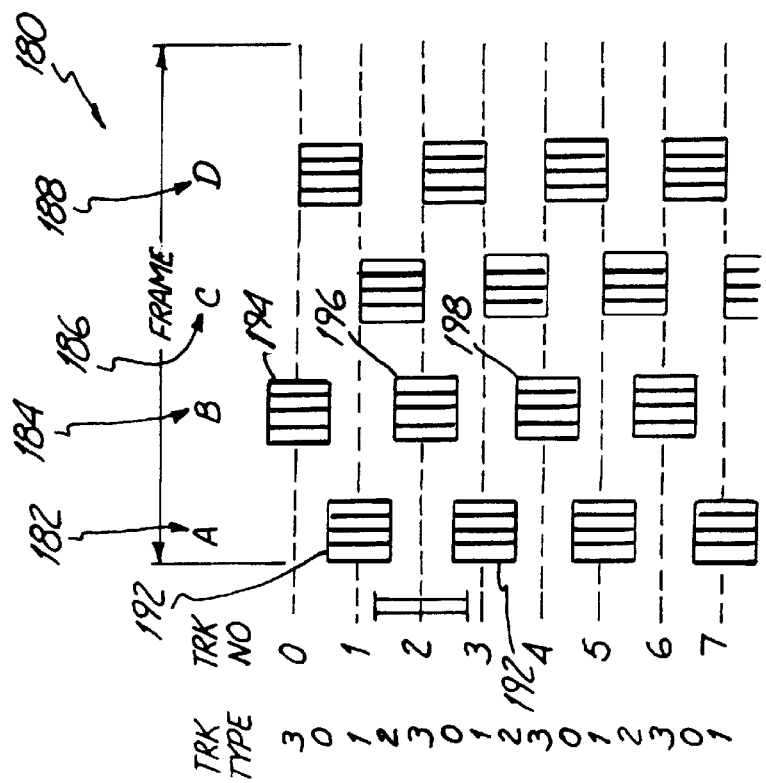
FIG. 2 is a layout for a portion of one type of servo field.

FIG. 2 shows a layout for a servo section 180 used to position a head over disc 122. In FIG. 2, the radial dimension of disc 122 is shown vertically and the angular dimension of disc 122 is shown horizontally. Servo section 180 includes four split servo burst fields, 182, 184, 186, and 188, which are labeled A, B, C, and D, respectively. The servo burst fields extend in a radial direction and each includes a plurality of isolated transition areas. For example, servo burst field 182 includes isolated transition areas 190 and 192, and servo burst field 184 includes isolated transition areas 194, 196, and 198. Each isolated transition area includes a series of changes in the direction of the disc's magnetic moment. These changes, or transitions, are aligned in radially extending columns within each transition area such that an entire radial column has the same magnetic moment. These transitions produce a read signal as the head passes over a transition area.

Each burst field's isolated transition areas are radially offset from the transition areas of other burst fields. Specifically, the transition areas in servo burst field 184 are radially offset from the transition areas in servo burst field 182 by a track width; the transition areas in burst field 186 are radially offset from the transitions areas in servo burst field 182 by one-half a track width; and the transitions areas in servo burst field 188 are radially offset from the transitions areas in servo burst field 182 by one and one-half track widths.

As the head passes cicumferentially over the layout of FIG. 2, it produces a servo read signal that can be used to identify the location of the head within a two-track wide range. Thus, if the position of the head is known to be within tracks 3 or 4 of FIG. 2, the servo read signal provides the head's location within those two tracks. Since the radial patterns of the servo burst fields repeat every two tracks, circumferential paths that are two tracks apart create the same servo read signal. Thus, track 0 and track 2 of FIG. 2 produce the same servo read signal.

In FIG. 2, paths that follow a track center are shown with a horizontal dotted line that intersects a track number. The boundaries between tracks are located half-way between each horizontal dotted line. The paths along track center lines and boundaries can be grouped into four types, 0, 1, 2, or 3, where paths of identical types produce identical read signals over the servo bursts. For example, track center paths for tracks 0 and 2 are both type 3 paths. Graphs of the servo signal produced along each path type are shown in FIGS. 3, 4, 5, and 6.

Figure 3:
FIG. 3 is a servo read signal created by a head centered on a path of type zero.

FIG. 3 shows a read signal produced by a read head passing along a path type of 0. Along this path type, only half of the read head passes over transition areas in servo burst fields 182, and 184. Thus, the servo signal of FIG. 3 has a magnitude of one-half for both servo burst field 182 and servo burst field 184. The head does not pass through a transition area in servo burst field 186 resulting in essentially no magnitude in the servo signal for this servo burst field. The entire head passes through a transition area in servo burst field 188 resulting in a full magnitude servo signal.

Figure 4:
FIG. 4 is a servo read signal created by a head centered on a path of type 1.
Figure 6:
FIG. 6 is a servo read signal created by a head centered on a path of type 3.
Figure 5:
FIG. 5 is a servo read signal created by a head centered on a path of type 2.

FIGS. 4, 5, and 6 show examples of the read signal produced along paths of types 1, 2, and 3, respectively. Note that the full-magnitude pulses and the half-magnitude pulses are associated with different servo burst fields in each of the FIGS. 3, 4, 5, and 6. This allows the servo signal to be used to identify the location of the head within a two track range.

To produce a normal position error value using the layout of servo section 180, the magnitude of the read signal in each region is determined. This can be achieved by rectifying the read signal and performing either peak detection or integration on the rectified signal to create a position error burst value for each region. The value of the read signal at servo burst field 184 is subtracted from the value of the read signal at servo burst field 182 to produce the normal position error value. To produce a quadrature position error value, the value of the read signal at servo burst field 188 is subtracted from the value of the read signal at servo burst field 186.

FIG. 7 shows a layout for a servo section 400, which shows an alternative layout for a servo field. Specifically, servo section 400 shows a "null" pattern that includes a normal phase pattern 402 and a quadrature phase pattern 404. Each pattern is constructed from blocks of uniform magnetic moment. For example, normal phase pattern 402 includes block 406, which as a uniform magnetic moment pointing to the right side of the page, and block 408, which has a uniform magnetic moment pointing to the left of the page. In FIG. 7, all portions of the disc that have the same magnetic moment as block 408 are shown in white and all portions that have the same magnetic moment as block 406 are shown in black.

Note that both normal phase pattern 402 and quadrature phase pattern 404 are constructed from rows of alternating blocks of magnetic moments. Neighboring rows are offset from each other so that a transition in the magnetic moment in one direction in one row is aligned with a transition in the magnetic moment in the opposite direction in two neighboring rows. Also note that normal phase pattern 402 is radially offset from quadrature phase pattern 404. In fact, the two patterns are offset by ninety degrees.

In FIG. 7, four track centers, 0, 1, 2, and 3 are shown. A read signal 418 produced by the read head as it passes along track center 2 is shown in FIG. 8-1. As the head passes through normal phase pattern 402 it produces signal portion 420, which is essentially zero across the entire normal phase pattern. The reason for this can be seen in FIGS. 8-2 and 8-3, which show the portions of read signal 418 that are produced by the radially outer-half of the read head and the radially inner-half of the read head, respectively.

Since each half of the head passes over an equal portion of the transitions the head encounters in normal phase pattern 402, the signals shown in FIGS. 8-2 and 8-3 have pulses of the same amplitude. However, along track center 2 of normal phase pattern 402, when the outer-half of the head is encountering a transition in one direction, the inner-half of the head is encountering a transition in the opposite direction. Thus, the respective read signals in FIGS. 8-2 and 8-3 have equal but opposite pulses within normal phase pattern 402. Because of this, when the two portions of the read signal are added together, they cancel each other.

In quadrature phase pattern 404, along track center 2, the entire read head encounters the same transitions. This results in pulse of the same magnitude and polarity in the signal portions of FIGS. 8-2 and 8-3, resulting in full amplitude pulses in signal portion 422 of read signal 418 of FIG. 8-1.

The read signals provided by normal phase pattern 402 and quadrature phase pattern 404 can be used to provide position error values by mixing the read signal with a synchronous clock signal, such as the clock signal shown in FIG. 8-4. By mixing the two signals together, the read signal is rectified such that all of the pulses for a particular phase pattern have the same polarity. Thus, the pulses for the normal phase pattern will either be all positive or all negative. Similarly, the pulses for the quadrature phase pattern will either be all positive or all negative.

With this synchronous mixing, the magnitude and the polarity of the pulses together provide an indication of the location of the head. Thus, if the head is off-center from track 2 toward track 1, the magnitude of the pulses from the normal phase pattern will increase, and the pulses will have a positive polarity. If the head is off-center from track 2 toward track 3, the magnitude of the pulses from the normal phase pattern will increase, and the pulses will have a negative polarity.

To generate a position error value for each phase pattern, the synchronously rectified read signal is divided into a normal phase section and a quadrature phase section. The two sections are then integrated to produce a normal position error value and a quadrature position error value.

Those skilled in the art will recognize that other servo patterns beyond those shown in FIGS. 2 and 7 are possible. The servo patterns shown in FIGS. 2 and 7 are merely illustrative. Any servo pattern that provides a normal position error value and a quadrature position error value that are ninety degrees out of phase can be used with the present invention.

Under the present invention, an extended normal and an extended quadrature position error signal can be generated. The normal position error signal, which is referred to by the present inventors as "NPQ+SEAMLESS$_n$", is defined as:

$$NPQ + \text{SEAMLESS}_n = \frac{N+Q}{|N-Q|+|N+Q|} \qquad \text{Equation 3}$$

where |x| represents the magnitude of x. The quadrature position error signal of the present invention is referred to as "NPQ+SEAMLESS$_q$" and is described by the following equation:

$$NPQ + \text{SEAMLESS}_q = \frac{N-Q}{|N-Q|+|N+Q|} \qquad \text{Equation 4}$$

Note that the numerator in Equation 3 is equal to the NPQ position error signal of the prior art and that the numerator of Equation 4 is equal to the NMQ position error signal of the prior art. Also note that the denominators in both Equation 3 and Equation 4 are equal to the sum of the magnitudes of the NMQ and NPQ position error signals of the prior art. By dividing by these magnitudes, the present invention produces two position error signals that are limited to values between +1 and −1.

The normal and quadrature position error signals of the present invention may be used alone or may be used together by commutating between the NPQ+SEAMLESS$_n$ and NPQ+SEAMLESS$_Q$ position error signals defined above. This commutation occurs when the position error signals are both equal to +/−0.5.

Although the position error signal described above provides better linearity for narrower heads, SEAMLESS position error signals of the prior art continue to provide better linearity for wider heads. One aspect of the present invention, provides a mechanism from switching between the NPQ+SEAMLESS position error signals of the present invention and the SEAMLESS position error signals of the prior art. This mechanism is based on the gain ratio of the respective position error signals for the head width used in the storage system. The gain ratio is the ratio of the signal's maximum slope over its minimum slope within a valid region of operation. Thus, if a position error signal has a maximum slope of 4 and a minimum slope of 2 over a selected range, it would have a gain ratio of 2. The preferred gain ratio specification requires a gain ratio below 2.

FIG. 9 is a graph of gain ratios for a NPQ+SEAMLESS position error signal and a SEAMLESS position error signal as a function of magnetic reader width normalized to the track width. The gain ratio is shown on vertical axis 240 and the normalized magnetic reader width is shown on horizontal axis 242. Graph 244 shows the relationship between gain ratio and magnetic reader width for an NPQ+SEAMLESS position error signal and graph 246 shows the relationship between gain ratio and magnetic reader width for a SEAMLESS position error signal.

From the graphs of FIG. 9, it is apparent that for a normalized magnetic reader width below 0.65, the present invention's position error signal of NPQ+SEAMLESS should be used by the servo system in positioning the head since it has the lowest gain ratio. Above a normalized magnetic reader width of 0.65, the SEAMLESS position error signal should be used by the servo system.

Figure 10:
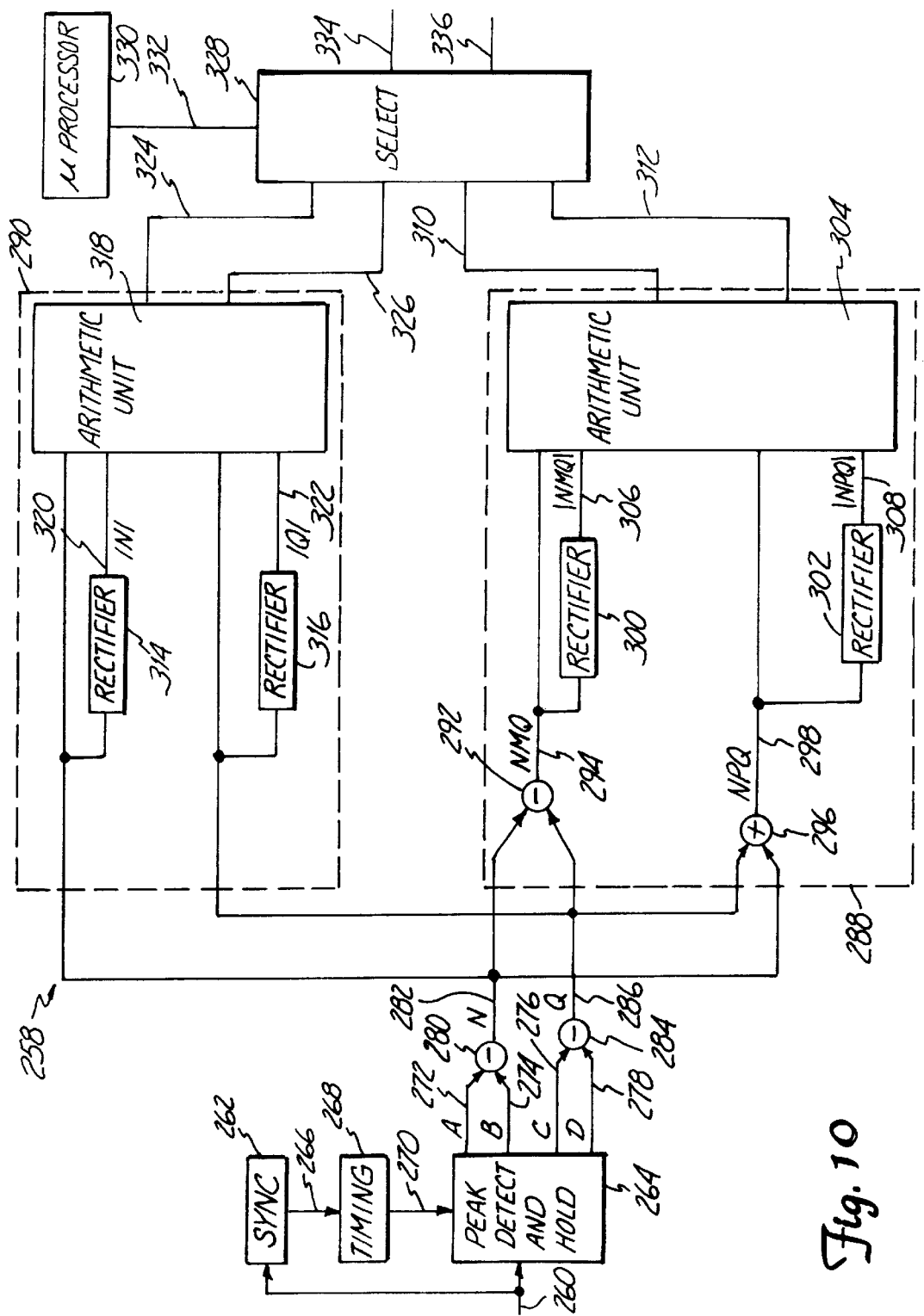
FIG. 10 is a block diagram of a position error signal generating system of the present invention.

FIG. 10 is a block diagram of a position error signal generating circuit 258 found within a servo system of the present invention. Specifically, generating circuit 258 is designed to be used with servo patterns such as the pattern shown in FIG. 2 above. Generating circuit 258 produces a position error signal based upon a servo read signal 260, which is provided to generating circuit 258 by read circuitry (not shown).

Read signal 260 is provided to a synchronization circuit 262 and to a peak-detect and hold circuit 264. Based on transitions in read signal 260, synchronization circuit 262 generates a clock signal 266 that is provided to a timing circuit 268. Timing circuit 268 generates timing intervals 270, which are provided to peak-detect and hold circuit 264.

Peak-detect and hold circuit 264 uses timing intervals 270 to isolate the portions of servo signal 260 assigned to each servo burst field A, B, C, and D. Peak-detect and hold circuit 264 isolates these four portions of read signal 260 and latches peak amplitudes within these portions so that the different portions of read signal 260 can be arithmetically combined. Peak-detect and hold circuit 264 produces servo burst values 272, 274, 276, and 278 which relate to servo burst fields A, B, C, and D, respectively.

Servo burst value 274 is subtracted from servo burst value 272 by arithmetic unit 280 to produce normal position error value 282, also known as N. Servo burst value 278 is subtracted from servo burst value 276 by arithmetic unit 284 to produce quadrature position error value 286, also known as Q.

Position error values 282 and 286 are provided to combinatorial logic units 288 and 290. Combinatorial logical unit 288 provides the NPQ+SEAMLESS position error values of the present invention and combinatorial logic 290 provides the SEAMLESS position error values of the prior art.

In combinatorial logic 288, quadrature position error value 286 is subtracted from normal position error value 282 by arithmetic unit 292, to produce NMQ position error value 294. Position error values 282 and 286 are added together by arithmetic unit 296 to produce NPQ position error value 298.

NMQ position error value 294 and NPQ position error value 298 are provided to respective rectifiers 300 and 302, as well as to arithmetic unit 304. Rectifiers 300 and 302 create the absolute values of NMQ position error value 294 and NPQ position error value 298, respectively, to produce position error magnitudes 306 and 308, respectively, which are provided to arithmetic unit 304. Arithmetic unit 304 uses NMQ position error value 394, NPQ position error value 398 and position error magnitudes 306 and 308 in equations 3 and 4 above to produce normal NPQ+SEAMLESS$_n$ position error value 310 and quadrature NPQ+SEAMLESS$_q$ position error value 312.

Combinatorial logic 290 directs normal position error value 282 and quadrature position error value 286 to rectifiers 314 and 316, respectively, and to arithmetic unit 318. Rectifiers 314 and 316 provide the absolute values of position error values 282 and 286, producing position error magnitudes 320 and 322, which are provided to arithmetic unit 318. Arithmetic unit 318 uses equations 1 and 2 above to produce SEAMLESS normal position error value 324 and SEAMLESS quadrature position error value 326.

Although combinatorial logic 288 and 290 have been described as using rectifiers to produce magnitude values, those skilled in the art will recognize that more sophisticated logic may be used. Specifically, the polarity of the normal and quadrature position error values can be used to select the type of arithmetic operation performed on the position error values. For example, if the normal position error value is negative and the quadrature position error value is positive the normal position error value may be subtracted from the quadrature position error value to achieve the addition of their magnitudes.

Position error values 310, 312, 324, and 326 are provided to select logic 328, which is controlled by microprocessor 330 through control line 332. Select logic 328 either provides NPQ+SEAMLESS$_n$ position error value 310 and NPQ+SEAMLESS$_q$ position error value 312 at its outputs 334 and 336 or provides SEAMLESS normal position error value 334 and SEAMLESS quadrature position error value 326 at its outputs 334 and 336. Microprocessor 330 chooses between the two sets of position error values based on criteria such as which corresponding position error signal provides a lower gain ratio for the particular magnetic reader associated with the servo system.

Although select logic has been shown in FIG. 10, those skilled in the art will recognize that microprocessor 330 could control enable inputs in arithmetic units 304 and 318 directly instead of using select logic. In such embodiments, the respective outputs of arithmetic units 304 and 318 are tied together.

Figure 11:
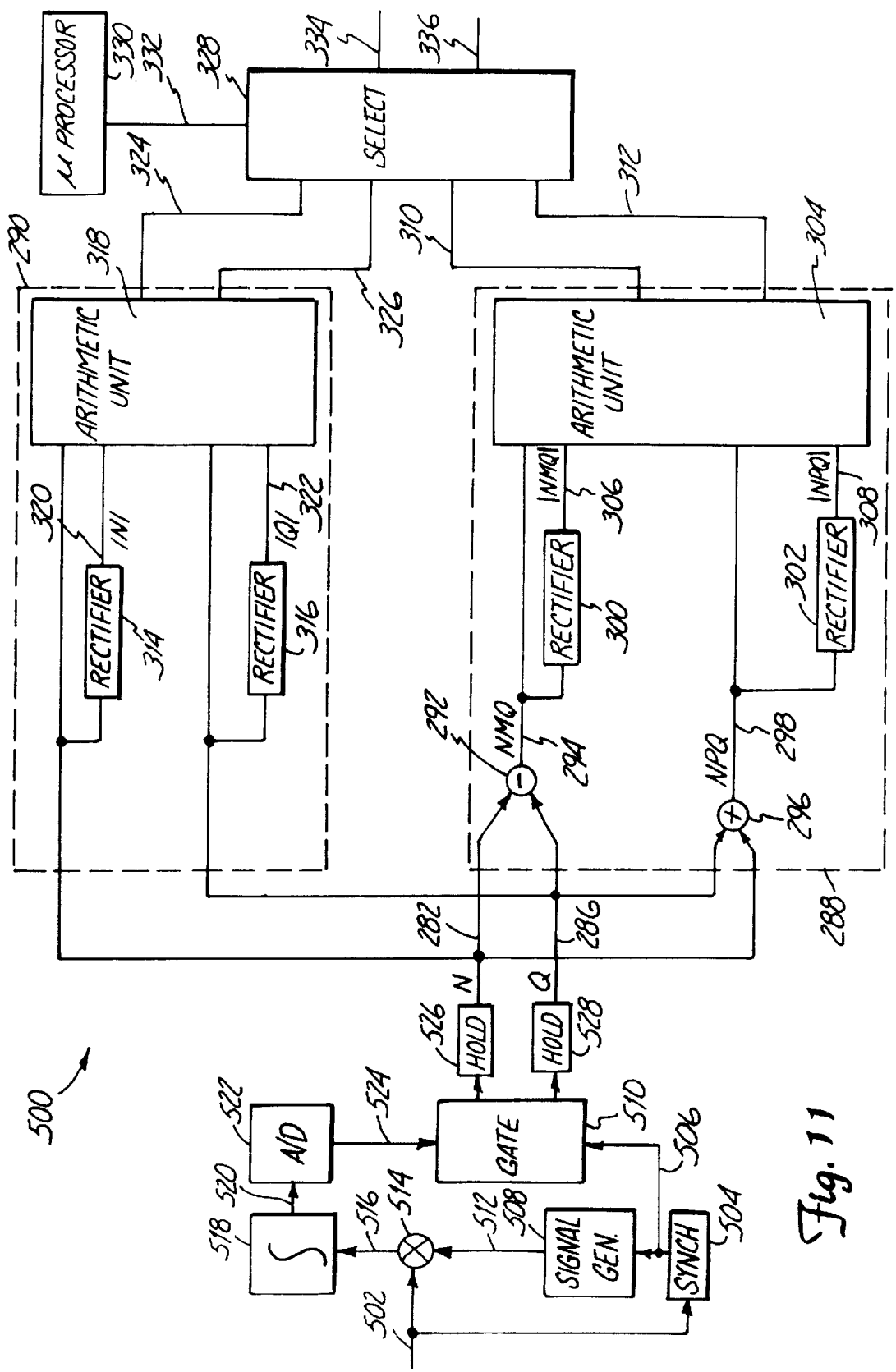
FIG. 11 is a second embodiment of a position error signal generating system of the present invention.

FIG. 11 is a block diagram showing signal generating circuit 500, which is a second embodiment of a signal generating circuit under the present invention. Signal generating circuit 500 is useful with servo patterns such as the "null" patterns shown in FIG. 7. Signal generating circuit 500 differs from signal generating circuit 258 of FIG. 10 in the manner in which it generates the normal position error value N and the quadrature position error value Q. The manner in which signal generating circuit 500 produces position error values 334 and 336 from position error values N and Q is the same as that describe for generating circuit 258 of FIG. 10. Thus, those circuit elements that perform the same functions in both FIGS. 10 and 11 are numbered the same in both figures.

In generating circuit 500 of FIG. 11, a read signal 502 is input to a synchronization circuit 504, which produces a base clock signal 506 that is input to a signal generator 508 and a gate circuit 510. Signal generator 508 uses base clock signal 506 to generate a mixing signal 512 that is preferably, but not necessarily, a square wave.

Mixing signal 512 is input to a mixing circuit 514, which also receives read signal 502. Mixing circuit 514 multiplies read signal 502 by mixing signal 512. Because mixing signal 512 is synchronized to read signal 502, the multiplication results in a synchronously rectified signal 516. Rectified signal 516 may have both positive and negative portions. However, for any portion of the read signal corresponding to a single phase pattern in a single servo field, rectified signal 516 should have a single polarity. This type of rectification is discussed further above in connection with FIG. 8-4.

Rectified signal 516 is input to an integrator 518, which integrates the rectified signal to produce an integration signal 520. Integration signal 520 is sampled by analog-to-digital convertor 522, which converts the samples into digital signal 524.

Digital signal 524 is gated by gate circuit 510 at set intervals that are measured using base clock 506. Gate circuit 510 alternates between gating digital signal 524 to a hold circuit 526 and gating digital signal 524 to a hold circuit 528. Preferably the gating interval is timed such that digital signal 524 is at a maximum when the value is gated, corresponding to the head reaching the end of a servo phase pattern. Through this process, hold circuit 526 holds the normal position error value, N, and hold circuit 528 holds the quadrature position error value, Q.

Hold circuit 526 is coupled to arithmetic units 318, 292, and 296, and rectifier 314, and thus provides normal position error value, N, to those elements. Hold circuit 528 is coupled to arithmetic units 318, 292, and 296, and rectifier 316, and thus provides quadrature position error value, Q, to those elements.

Although the present invention has been described using a specific arithmetic relationship for generating the numerators of the NPQ+SEAMLESS normal and quadrature position error signals, those skilled in the art will recognize that these equations can change within the scope of the invention. The critical aspect of the invention is that a normal and a quadrature position error signal are used together to generate the numerator of the position error signal. The way in which the normal and quadrature signals are arithmetically combined depends upon the particular implementation of the servo system.

In summary, the present invention provides a method of producing a position error value 334, 336 indicative of a transducer head's position over a recording medium 122. The method includes storing a normal position error value 282 generated from a normal servo field 402 and a quadrature position error value 286 generated from a quadrature servo field 404 that is ninety degrees out of phase from the normal servo field 402. A position error numerator 294, 298 is created arithmetically by combining the normal position error value 282 and the quadrature position error value 286. A position error denominator 306, 308 is created based on the normal position error value 282 and the quadrature position error value 286. The position error numerator 294 is divided by the position error denominator 306, 308 to produce the position error value 310.

The present invention's servo system, which is located in a disc drive, comprises storage means 526, 528 for storing a normal position error value 282 and a quadrature position error value 286. It also includes first arithmetic means 296 for combining the normal position error value 282 and the quadrature position error value 286 into a first position error numerator 298. Second arithmetic means 292, 296, 300, and 302 creates a position error denominator 306 and 308 based on the normal position error value 282 and the quadrature position error value 286. Third arithmetic means 304 divides the first position error numerator 298 by the position error denominator 306 and 308 to produce a first position error value 312.

In preferred embodiments of the present invention, the servo system further includes sixth arithmetic means 314 and 316 for producing a second position error denominator 320 and 322. The servo system further includes a seventh arithmetic means 318 for producing a third position error value 324 by dividing the normal position error value 282 by the second position error denominator 322 and 320. Further embodiments of the invention include a selection mechanism 328 and 330 for selecting between the first position error value 312 and the third position error value 324 to produce a controlling position error value 334.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the position error signals while maintaining substantially the same functionality without departing from the scope and spirit of the present invention. In addition, although the preferred embodiment described herein is directed to a magnetic disc drive, it will be appreciated by those skilled in the art that the teachings of the present invention can be applied to other systems, like optical disc drives, magneto-optical disc drives and tape drive systems, without departing from the scope and spirit of the present invention.

What is claimed is:

1. A method of producing a position error value indicative of a transducer head's position over a recording medium, the method comprising:

storing a normal position error value generated from a normal servo field located on the recording medium and a quadrature position error value generated from a quadrature servo field located on the recording medium, the normal servo field being ninety degrees out of phase from the quadrature servo field;

creating a position error numerator by arithmetically combining the normal position error value and the quadrature position error value;

creating a position error denominator based on the normal position error value and the quadrature position error value; and dividing the position error numerator by the position error denominator to produce the position error value.

2. The method of claim 1 wherein the position error denominator is partially based on the magnitude of the position error numerator.

3. The method of claim 2 further comprising creating a second position error value by creating a second position error numerator different from the position error numerator, the second position error numerator formed by arithmetically combining the normal position error value and the quadrature position error value, the second position error value created by dividing the second position error numerator by the position error denominator.

4. The method of claim 3 wherein the position error denominator is the sum of the magnitude of the position error numerator and the magnitude of the second position error numerator.

5. The method of claim 4 wherein the position error numerator is equal to the normal position error value plus the quadrature position error value and the second position error numerator is equal to the normal position error value minus the quadrature position error value.

6. The method of claim 3 further comprising selecting between the position error value and the second position error value based upon the position of the transducer head.

7. The method of claim 1 further comprising using the position error value to determine a transducer head's position over a recording medium.

8. A servo system in a disc drive, the servo system for positioning a head relative to a medium, the servo system comprising:

hold circuits capable of storing a normal position error value and a quadrature position error value read from the medium by the head; and combinatorial logic coupled to the hold circuits and capable of:
  combining the normal position error value and the quadrature position error value to form a first position error numerator;
  creating a position error denominator based on the normal position error value and the quadrature position error value; and
  dividing the first position error numerator by the position error denominator to produce a first position error value.

9. The servo system of claim 8 wherein the combinatorial logic is capable of creating the position error denominator based in part on the magnitude of the first position error numerator.

10. The servo system of claim 9 wherein the combinatorial logic is further capable of combining the normal position error value and the quadrature position error value to form a second position error numerator distinct from the first position error numerator.

11. The servo system of claim 10 wherein the combinatorial logic is capable of creating the position error denominator based in part on the magnitude of the second position error numerator.

12. The servo system of claim 11 wherein the combinatorial logic is further capable of dividing the second position error numerator by the position error denominator to produce a second position error value.

13. The servo system of claim 11 wherein the combinatorial logic is capable of:
  creating the position error denominator as the sum of the magnitude of the first position error numerator and the second position error numerator;
  adding the normal position error value to the quadrature position error value to produce the first position error numerator; and
  subtracting the quadrature position error value from the normal position error value to produce the second position error numerator.

14. The servo system of claim 8 further comprising second combinatorial logic capable of producing a second position error denominator equal to the magnitude of the normal position error value plus the magnitude of the quadrature position error value and capable of producing a third position error value by dividing the normal position error value by the second position error denominator.

15. The servo system of claim 14 further comprising a selection mechanism that selects either the first position error value or the third position error value as a controlling position error value capable of being used to control the position of the head.

16. The servo system of claim 15 further comprising an enabling mechanism capable of enabling either the combinatorial logic or the second combinatorial logic.

17. The servo system of claim 8 further comprising a controller capable of using the position error value to determine a transducer head's position over a recording medium.

* * * * *